United States Patent [19]

Krause et al.

[11] Patent Number: 5,188,379
[45] Date of Patent: Feb. 23, 1993

[54] AUTOMATIC LEVELING SYSTEM FOR RECREATIONAL VEHICLES

[75] Inventors: Hans H. Krause, Mequon; Ralph O. Krause, Milwaukee, both of Wis.

[73] Assignee: Applied Mechanis, Inc., Lannon, Wis.

[21] Appl. No.: 600,759

[22] Filed: Oct. 19, 1990

[51] Int. Cl.⁵ .............................................. B60S 9/12
[52] U.S. Cl. .................................. 280/6.12; 280/763.1
[58] Field of Search ............... 280/6.1, DIG. 1, 763.1, 280/6.12, 840; 180/41, 320; 307/9.1, 10.1; 414/909; 901/49

[56] References Cited

U.S. PATENT DOCUMENTS

| | | | |
|---|---|---|---|
| 3,164,275 | 1/1965 | Schatzl et al. | 280/6.1 |
| 3,817,493 | 6/1974 | Hanser | 254/423 |
| 3,912,289 | 10/1975 | Czajkowski, Jr. | 280/6.1 |
| 4,061,309 | 12/1977 | Hanser | 254/423 |
| 4,142,710 | 3/1979 | Okuda | 280/6.1 X |
| 4,165,861 | 8/1979 | Hanser | 254/423 |
| 4,551,059 | 11/1985 | Petoia | 414/909 |
| 4,597,584 | 7/1986 | Hanser | 280/6.1 |
| 4,743,037 | 5/1988 | Hanser | 280/6.1 |
| 4,746,133 | 5/1988 | Hanser et al. | 280/6.1 |
| 4,784,400 | 11/1988 | Hofius | 280/6.1 |
| 4,838,394 | 6/1989 | Lemme et al. | 280/840 X |
| 4,913,458 | 4/1990 | Hamilton | 280/6.1 |

FOREIGN PATENT DOCUMENTS

2094732 9/1982 United Kingdom ............. 280/763.1

Primary Examiner—Tamara L. Graysay
Attorney, Agent, or Firm—Reinhart, Boerner, Van Deuren, Norris & Rieselbach

[57] ABSTRACT

A plurality of hydraulic jack assemblies are located adjacent the wheels of a recreational vehicle. The jacks are initially extended until each jack contacts the ground with a relatively low initial pressure. Thereafter, the jacks are individually actuated as necessary to bring the vehicle to a level position. After leveling, the jacks are once again actuated to ensure that each of the jacks contacts the ground with at least the predetermined pressure. A relatively large, circular foot pad is fitted to the bottom of each jack to distribute the contact force over a relatively large area of the ground. Each of the hydraulic jacks includes a bracket, having a three sided channel member, for receiving the lifting force developed by a hydraulic lift cylinder and for transferring the lifting force to the frame of the vehicle. A hand held controller having a relatively long extension cable, permits operation of the automatic leveling system from outside, as well as inside, the vehicle.

18 Claims, 6 Drawing Sheets

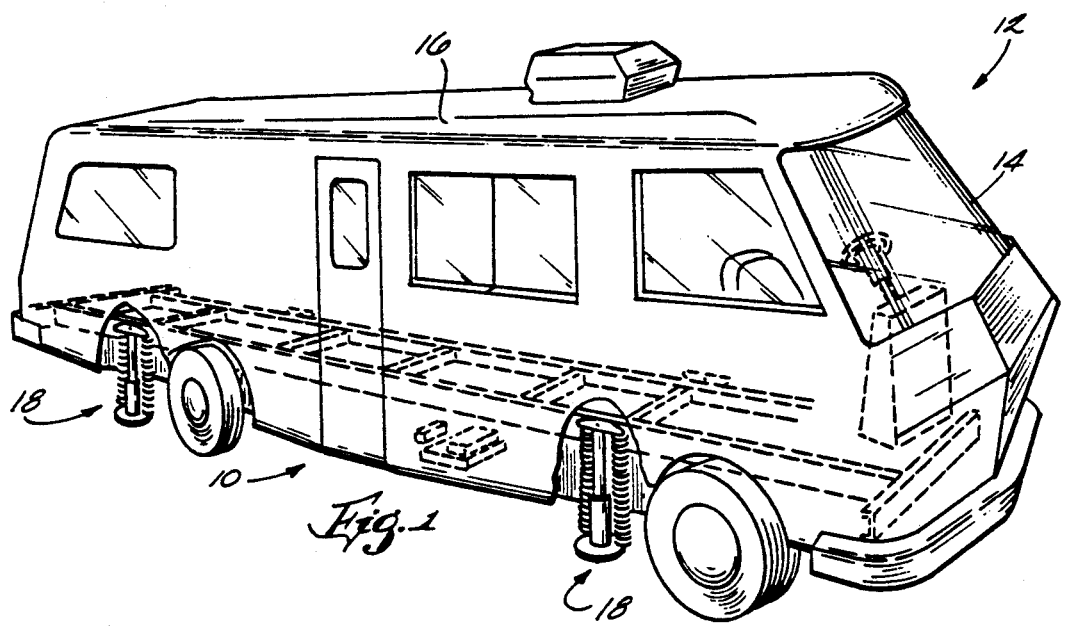
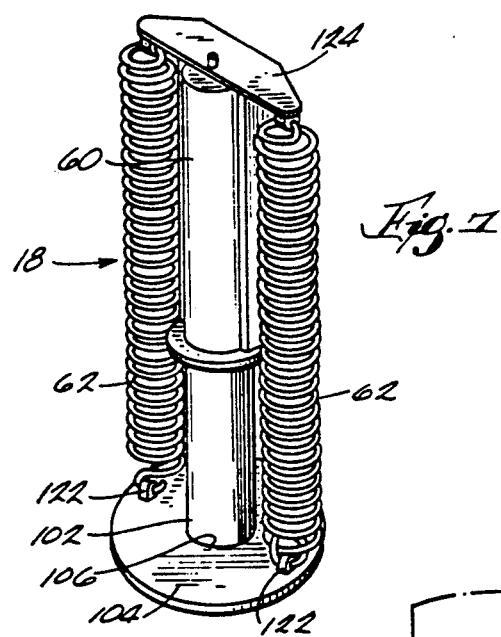
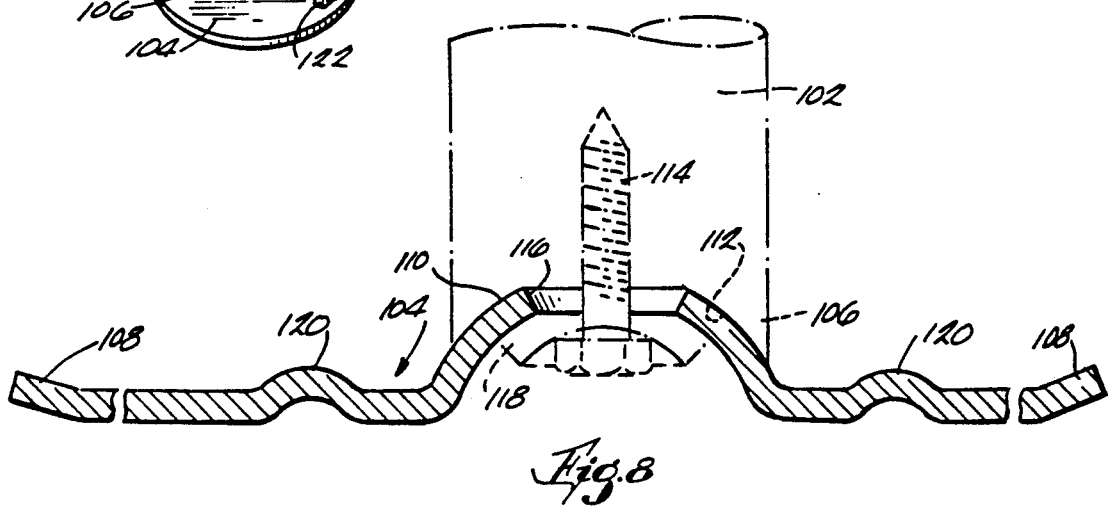

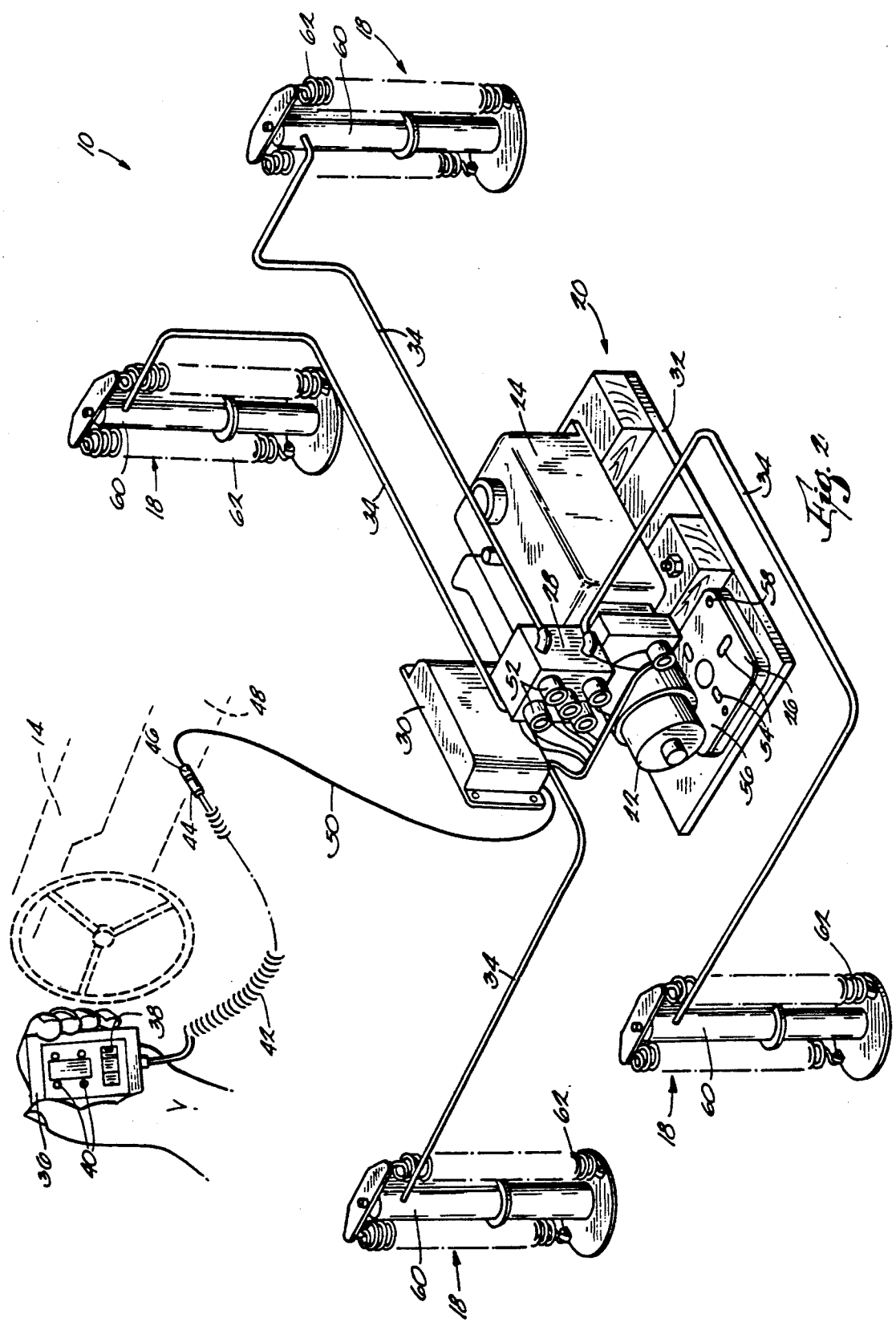

AUTOMATIC LEVELING SYSTEM FOR RECREATIONAL VEHICLES

BACKGROUND OF THE INVENTION

This invention relates generally to vehicle leveling systems and, more particularly, to systems for automatically leveling recreational vehicles.

Recreational vehicles having integral living quarters are well known in the art. Such vehicles provide both transportation and shelter to their owners and occupants. Although a certain amount of movement and motion are expected and tolerated when the vehicle is on the road, such movement is highly undesirable when the vehicle is used as temporary living quarters. Furthermore, comfort and utility can suffer if the vehicle is not substantially level when parked. Because recreational vehicles are frequently parked in remote or rugged areas that are not likely to be perfectly level, various systems and methods have been proposed for securing a recreational vehicle in a level position over non-level terrain.

In one common arrangement, hydraulic jacks are mounted at strategic locations on the recreational vehicle. The jacks extend into contact with the ground and are manually operated so as to bring the vehicle to a level position. Level indicators are sometimes used to help the operator determine when the vehicle is level. This can be a complex, time consuming operation that requires some degree of skill on the part of the operator.

To simplify the leveling process, automatic leveling systems have been proposed. In these systems, an electrical level sensor, which typically consists of a number of mercury switches mounted on a horizontal plate, operates in conjunction with an electronic control circuit to sense which corners of the vehicle are low. The control circuit actuates the jacks as necessary to automatically level the vehicle. Operator involvement is minimal, and leveling can be accomplished relatively quickly.

Despite the advantages of existing automatic leveling systems, many difficulties yet remain. For example, severe strain or torque can be placed on the vehicle frame if a jack lifts one corner of the vehicle before the vehicle is adequately supported at the remaining corners. This tends to twist the entire vehicle causing a variety of problems. For example, doors, cabinets and drawers in the vehicle interior may bind as the vehicle twists. In extreme cases, the vehicle's windshield can be forced from its frame. Such twisting is most likely to occur when the ground is uneven and one jack contacts the ground well before the others.

Another problem with prior leveling systems results if the vehicle is brought to a level condition with only three out of the four jacks actually contacting the ground. This can occur, for example, if one of the jacks is located over a depression in the ground and the vehicle is brought to a level condition through the action of the remaining jacks. Although a level attitude is obtained, the vehicle is nevertheless unstable and can tilt, for example, if an occupant moves toward the vehicle's unsupported corner. Again, because the vehicle is not fully supported at all four corners, a twisting force can be imposed on the vehicle frame.

In view of the foregoing, it is a general object of the present invention to provide a new and improved automatic leveling system for recreational vehicles.

It is a further object of the present invention to provide an automatic leveling system that avoids the development of uneven or twisting forces on the vehicle during leveling.

It is a still further object of the present invention to provide an automatic leveling system for recreational vehicles that ensures that all jacks remain in contact with the ground following leveling.

It is a still further object of the present invention to provide an automatic leveling system that ensures vehicle stability following leveling.

It is a still further object of the present invention to provide an automatic leveling system that retracts the jacks without requiring the operator to slide or reach under the vehicle.

SUMMARY OF THE INVENTION

The invention provides an automatic leveling system for recreational vehicles. The automatic leveling system includes a plurality of hydraulic jacks and a control system for extending each of the jacks until each of the jacks contacts the ground below the recreational vehicle with a first predetermined pressure. The automatic leveling system further includes a level sensor for sensing a level condition and an additional control system, responsive to the level sensor, for further extending selected ones of the jacks until the level sensor senses a level condition. Additional control structure, responsive to achievement of the level condition, is provided for actuating any of the jacks that do not then exert a predetermined minimum pressure on the ground to ensure, thereby, that each of the jacks is in contact with the ground following establishment of the level condition.

The invention also provides an automatic leveling system for recreational vehicles comprising a source of pressurized hydraulic fluid, a manifold having an inlet in fluid communication with the source and a plurality of fluid outlets communicating with the inlet, and a plurality of hydraulic jacks. Each of the hydraulic jacks includes a pressure sensor for sensing when the hydraulic pressure in the jack exceeds a predetermined threshold. A plurality of hydraulic lines are provided for communicating hydraulic fluid from the fluid outlets to the jacks. A plurality of solenoid controlled valves, coupled to the hydraulic lines, control hydraulic fluid flow from the fluid outlets to the hydraulic jacks. An electronic control circuit responds to the pressure sensors and operates to close the solenoid valve of a particular one of the hydraulic lines when the hydraulic pressure in the jack coupled to the particular hydraulic line exceeds the predetermined threshold.

The invention also provides an automatic leveling system for recreational vehicles comprising a plurality of hydraulic jacks, a bracket for mounting the jacks on the recreational vehicle, a level sensor for sensing a level condition and a control circuit. The control circuit is responsive to the level sensor and functions to actuate the jacks so as to bring the recreational vehicle to a level position. The control circuit includes a hand held control panel connected to an electrical cable for permitting operation of the automatic leveling system from outside as well as inside the recreational vehicle.

The invention also provides a hydraulic jack for use in leveling vehicles. The jack comprises a hydraulic cylinder including a cylinder rod having an outer end. The outer end has a concave depression formed therein. The hydraulic jack further includes a disk-shaped foot pad having a convex central portion shaped and dimensional to matingly engage the concave depression in the outer end of the cylinder rod. Structure is provided for securing the foot pad to the outer end of the cylinder rod so that the convex central portion of the foot pad is received in the concave depression of the cylinder rod and so that the foot pad is pivotable relative to the cylinder rod.

The invention also provides a mounting bracket for mounting a hydraulic cylinder of an automatic leveling system to a recreational vehicle. The mounting bracket includes an elongate three sided channel member defining an open channel dimensioned to receive therein the hydraulic cylinder. The bracket further includes a lower end plate secured across one end of the channel member and having an opening to permit the extension of the hydraulic cylinder therethrough. The bracket also includes an upper end plate secured across the remaining end of the channel member so as to engage the upper end of the hydraulic cylinder and prevent upward movement of the hydraulic cylinder relative to the channel member.

The invention also provides a hydraulic jack assembly comprising a hydraulic cylinder including a cylinder rod and an elongate three sided channel member defining an open channel dimensioned to receive therein a hydraulic cylinder. A lower end plate is secured across one end of the channel member and has an opening to permit extension of the hydraulic cylinder therethrough. An upper end plate is secured across the remaining end of the channel member so as to engage the upper end of the hydraulic cylinder and prevent upward movement of the hydraulic cylinder relative to the channel member. A disk-shaped foot pad is pivotally mounted to the distal end of the cylinder rod. A first return spring is connected at one end to the disk-shaped foot pad and at the other end to the upper end plate. A second return spring is connected at one end to the disk-shaped foot pad and at the other end to the upper end plate.

The invention also provides a method of operating a recreational vehicle automatic leveling system of the type having a plurality of hydraulic jacks and a level sensor for sensing a level condition. The method comprises the steps of extending each of the jacks until each of the jacks contacts the ground below the recreational vehicle with a first predetermined pressure. The method includes the further step of thereafter extending selected ones of the jacks until the level sensor senses a level condition. The method further includes the step of thereafter actuating any of the jacks that do not then exert a predetermined minimum pressure on the ground to ensure thereby that each of the jacks is in contact with the ground following establishment of a level condition.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a recreational vehicle having therein installed an automatic leveling system embodying various features of the invention.

FIG. 2 is simplified diagramatic view of the automatic leveling system shown in FIG. 1 showing the principal components thereof.

FIG. 7 is a perspective view of the hydraulic jack assembly shown in FIG. 6.

FIG. 8 is a cross-sectional view of a hydraulic jack assembly foot pad embodying various features of one aspect of the invention.

DESCRIPTION OF THE PREFERRED EMBODIMENT

Figure 3:
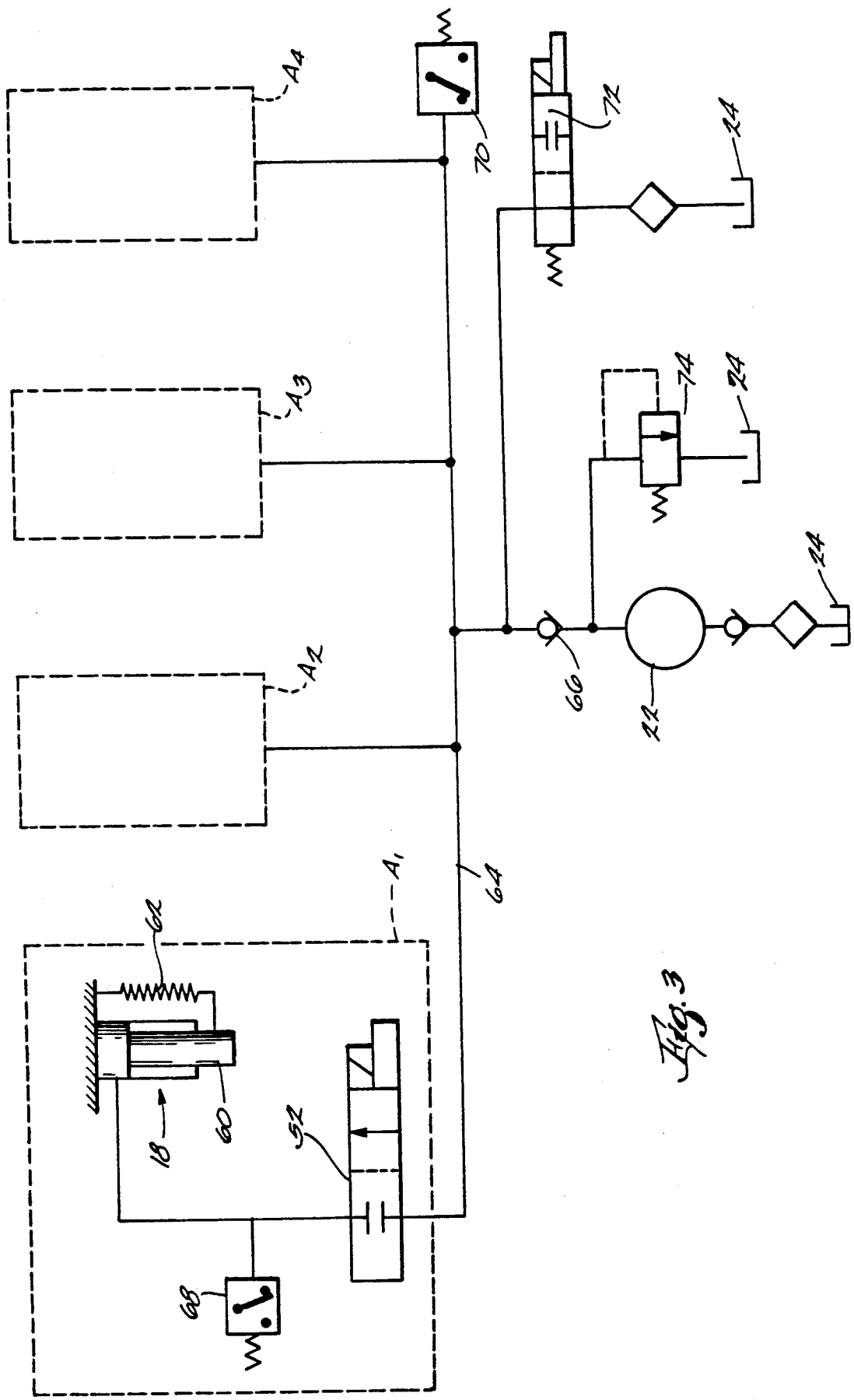
FIG. 3 is a schematic diagram of the hydraulic system of the automatic leveling system shown in FIGS. 1 and 2.

Referring to the drawings, and in particular, to FIG. 1, an automatic leveling system 10 embodying various features of the invention is shown installed in a recreational vehicle 12. As illustrated, the recreational vehicle 12 comprises a four-wheel vehicle having a driver's position 14 at one end and integral living quarters 16 at the other. The automatic leveling system 10 functions to place and maintain the recreational vehicle 12 in a level attitude when the vehicle is parked over uneven terrain. By keeping the vehicle level, vehicle safety, comfort and reliability are improved.

Referring further to FIGS. 1 and 2, the automatic leveling system 10 generally comprises a plurality of hydraulic jack assemblies 18 positioned at strategic locations on the vehicle 12 and oriented so as to contact the ground when extended. In the illustrated embodiment, four such hydraulic jack assemblies 18 are included and are located, respectively, adjacent the left front, left rear, right front and right rear wheels of the vehicle 12. The automatic leveling system 10 further includes a central unit 20 that contains a hydraulic pump 22, a reservoir 24 for hydraulic fluid, a level sensing device 26, a hydraulic control valve assembly 28 and an electronic control circuit 30. The central unit 20 is preferably mounted on a support 32 that, in turn, is mounted within a compartment adjacent the center of the vehicle 12. The individual hydraulic jack assemblies 18 are coupled to the hydraulic valve assembly through suitable hydraulic lines 34.

In accordance with one aspect of the invention, operation of the automatic leveling system 10 can be controlled through a hand control 36. The hand control 36 includes a plurality of control buttons 38 and indicators 40 and is electrically connected with the control circuitry 30 of the central unit 20 through an electrical cable 42. Preferably, the cable 42 comprises a coil cord having a plug 44 on one end that detachably engages a jack 46 in the vehicle dash board 48. The jack 46, in turn, is electrically connected to the central unit control circuitry 30 through an additional cable 50. The coil cord 42 preferably has sufficient length to enable the operator to control system operation from outside of, as well as inside, the vehicle 12. This allows the operator to observe system operation and avoid unsafe situations.

The hydraulic pump 22 preferably comprises an electrically operated pump of known construction. The pump 22 draws hydraulic fluid from the reservoir 24 and delivers the pressurized hydraulic fluid to the control valve assembly 28. The control valve assembly 28 includes a plurality of solenoid controlled valves 52 that respond to electrical control inputs generated by the electronic control circuitry 30.

To sense when the vehicle 12 is in a level attitude, the automatic leveling system 10 includes the level sensor 26. Preferably, the level sensor 26 is an electrically operated device. Many forms of level sensors are known. In the preferred embodiment, the level sensor 26 comprises four mercury switches 54 mounted on a generally planar member 56 that, in turn, is mounted on the central unit support 32. It will be appreciated that other forms of level sensors can be used. When the vehicle 12 is level, all four of the mercury switches 54 are electrically open. If the vehicle 12 is tilted one way or another, at least one, and possibly more, of the mercury switches 54 close. Preferably, the mercury switches 54 are oriented, so as to correspond to the respective positions of the vehicle wheels. Additionally, adjustable mounting screws 58 are provided so that the orientation of the level sensor 26 relative to the support 32 can be adjusted. This permits the level sensor 26 to sense the actual orientation of the vehicle 12 even though the support 32 itself might not be parallel to the plane of the level vehicle 12.

The hydraulic circuitry of the automatic leveling system 10 is shown schematically in FIG. 3. Although only one jack actuation circuit $A_1$, is shown in detail, it will be understood that the remaining jack circuits $A_2-A_4$, are similar in construction and operation. Each of the hydraulic jack assemblies 18 includes a single acting hydraulic cylinder 60 provided with one or more return springs 62. Each of the hydraulic cylinders 60 is coupled through a normally closed, manual override, solenoid valve 52 to a common hydraulic line or chamber 64. The hydraulic pump 22 is coupled through a check valve 66 to the common hydraulic line 64. Individual pressure switches 68 are associated with each of the hydraulic cylinders 60 to provide an electrical indication of whether the hydraulic pressure to the individual hydraulic cylinder 60 is above or below a first predetermined pressure. An additional pressure switch 70 is coupled to the common hydraulic line 64 and functions to shut down or otherwise disable the hydraulic pump 22 in the event pressure in the common hydraulic line 64 exceeds a predetermined second pressure that is higher than the first pressure. An additional, normally open, solenoid return valve 72 is coupled between the downstream side of the pump check valve 66 and the fluid reservoir 24. When open, the return valve 72 permits hydraulic fluid from the hydraulic cylinders 60 to drain into the reservoir 24 during cylinder retraction. A bypass valve 74, that opens at a third predetermined pressure that is higher than the second pressure, is connected between the hydraulic pump output and the reservoir 24. This valve 74 opens at very high hydraulic pressures to avoid pump damage in the event abnormally high hydraulic pressures are developed.

In accordance with one aspect of the invention, the automatic leveling system 10 operates to ensure that each of the jacks 18 is in contact with the ground with at least a predetermined minimum pressure before any of the jacks 18 is further extended to level the vehicle 12. To this end, the first predetermined pressure (sensed by the pressure switches 68) is relatively low (e.g. 500 PSI). In addition, each of the pressure switches 68 responds to that pressure and signals the control circuit 30 to close the solenoid valve 52 associated with the particular hydraulic cylinder 60 when that pressure is reached.

Figure 4:
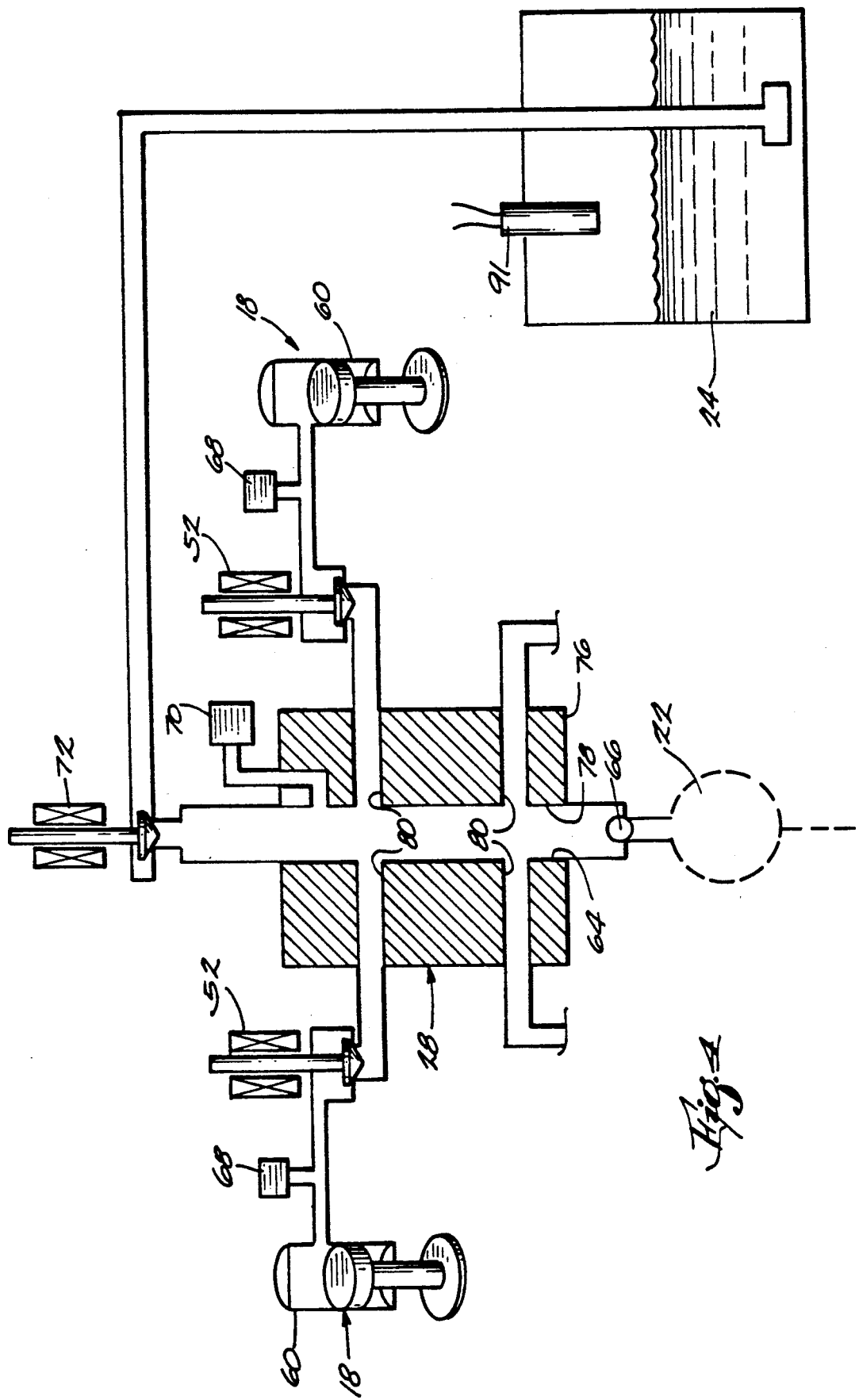
FIG. 4 is a simplified diagramatic view of the automatic leveling system hydraulic system, useful in understanding the operation of the hydraulic valve assembly manifold.

As best illustrated in FIG. 4, the hydraulic control valve assembly 28 includes a manifold 76 having an inlet 78 and a common chamber 64 that communicates the inlet 78 with a plurality of fluid outlets 80 that in turn communicate with the individual hydraulic cylinders 60. Initially, while each of the hydraulic jack assemblies 18 is extending toward, but not yet in contact with, the ground, each of the solenoid valves 52 is open. So long as any one of the jacks 18 is not yet in contact with the ground, the hydraulic pressure in the chamber 64 is substantially uniform and the pressure to any of the remaining jacks 18 can not exceed the relatively low pressure needed to extend the jacks 18 against the force of their return springs 62. Accordingly, the hydraulic pressure within the common chamber 64, and hence to each of the hydraulic jacks 18, will not begin to rise until each of the jacks 18 is in contact with the ground.

Once all the jacks 18 have been lowered into contact with ground, the hydraulic pressure within the common chamber 64 begins to rise. The hydraulic pressure continues to rise until it reaches the first threshold pressure at which point the pressure switches 68 signal the electronic control circuit 30 to close the solenoid valves 52. When all four solenoid valves 52 have been closed, the initial phase of system operation has been completed. At this point, each of the jacks 18 is firmly in contact with the ground. However, because the first predetermined pressure is relatively low (e.g. 500 PSI), the total force exerted by the jacks 18 is insufficient to substantially alter the position or attitude of the vehicle 12.

Following completion of the initial or first phase of system operation, the system 10 next operates in a second phase or automatic leveling mode. In this mode, the electronic control circuit 30 responds to closure of the individual mercury switches 54 within the level sensor 26 to actuate individual ones of the hydraulic jacks 18 as necessary to lift the vehicle 12 to a level attitude. In particular, the electronic control circuit 30 senses which of the four mercury switches 54 within the level sensor 26 are closed. Closure of a switch 54 indicates that the corresponding corner of the vehicle 12 is low. Accordingly, the control circuit 30 opens the solenoid valve 52 controlling the hydraulic jack 18 located at the low corner. This extends the jack 18 thereby raising the low corner. When the low corner has been sufficiently raised, the corresponding mercury switch 54 opens thereby signaling the control circuit 30 to close the solenoid valve 52 and prevent further extension or retraction of the hydraulic cylinder 18. It will be appreciated that, under ordinary circumstances, anywhere from one to three of the hydraulic jacks 18 may need to be actuated to achieve a level condition.

Once the level condition has been achieved, the automatic leveling system 10 enters still another or third phase of operation. During the automatic leveling phase of operation wherein the vehicle is actually raised to a level attitude, it is possible that one of the nonactuated hydraulic jacks 18 might be lifted away from contact with the ground through operation of the remaining jacks. In this event, the vehicle 12, although level, would only be supported by three rather than four jacks 18. The third phase of system operation recognizes this possibility and ensures that each of the jacks 18 remain in contact with the ground with at least a minimum predetermined force following leveling.

In the third phase of system operation, the electronic control circuit 30 interrogates each of the pressure switches 68 to ensure that at least the minimum hydraulic pressure is present at each jack 18. In the event one jack 18 is no longer in contact with the ground, its associated pressure will be low. The system 10, in response to the low pressure indication from the associated pressure switch 68, opens the associated solenoid valve 52 to deliver pressured hydraulic fluid to the hydraulic cylinder 60. This has the effect of once again lowering the hydraulic jack 18 into contact with the ground. After ground contact is made, the solenoid valve 52 remains open until the first predetermined threshold pressure is reached. This ensures that the jack 18 remains in firm contact with the ground but avoids disturbing the level condition of the vehicle 12 as could occur if a higher pressure where used.

Preferably, the third phase of system operation does not begin until a predetermined time period has elapsed following completion of the second phase operation. This allows the system to stabilize and thus avoids unintended response to transient conditions. Preferably, a three second (or longer) time delay is used.

When the vehicle 12 is to be moved, it is important that each of the hydraulic jacks 18 first be retracted clear of the ground. In the illustrated embodiment, cylinder retraction is achieved by opening each of the solenoid valves 52 and the return valve 72 simultaneously. This permits hydraulic fluid to flow into the reservoir 24 the return springs 62 retract the cylinders 60.

Cylinder retraction can be initiated by the operator's pushing a button on the hand control 36. The electronic control circuit 30 responds by opening each of the solenoid controlled valves 52 as well as the return valve 72. In the event the operator attempts to drive the vehicle 12 without first retracting the hydraulic jacks 18, the automatic leveling system 10 automatically initiates the jack retraction sequence. To this end, the system 10 responds to control inputs derived from the vehicle's ignition system and its transmission or parking brake. In the event the ignition switch is turned to the "on" position, the electronic control circuit 30 automatically retracts the hydraulic jacks 18.

It is possible that the recreational vehicle 12 and/or the automatic leveling system 10 might experience a total electrical failure while the jacks 18 are extended. To permit the vehicle 12 to be towed or otherwise moved under such circumstances, the automatic leveling system 10 provides for manual retraction of the jacks 18. To this end, each of the solenoid valves 52 can be opened manually. This permits fluid to drain from the hydraulic cylinders 60 to the reservoir 24 as the hydraulic jacks 18 are raised by their return springs 62.

Figure 5:
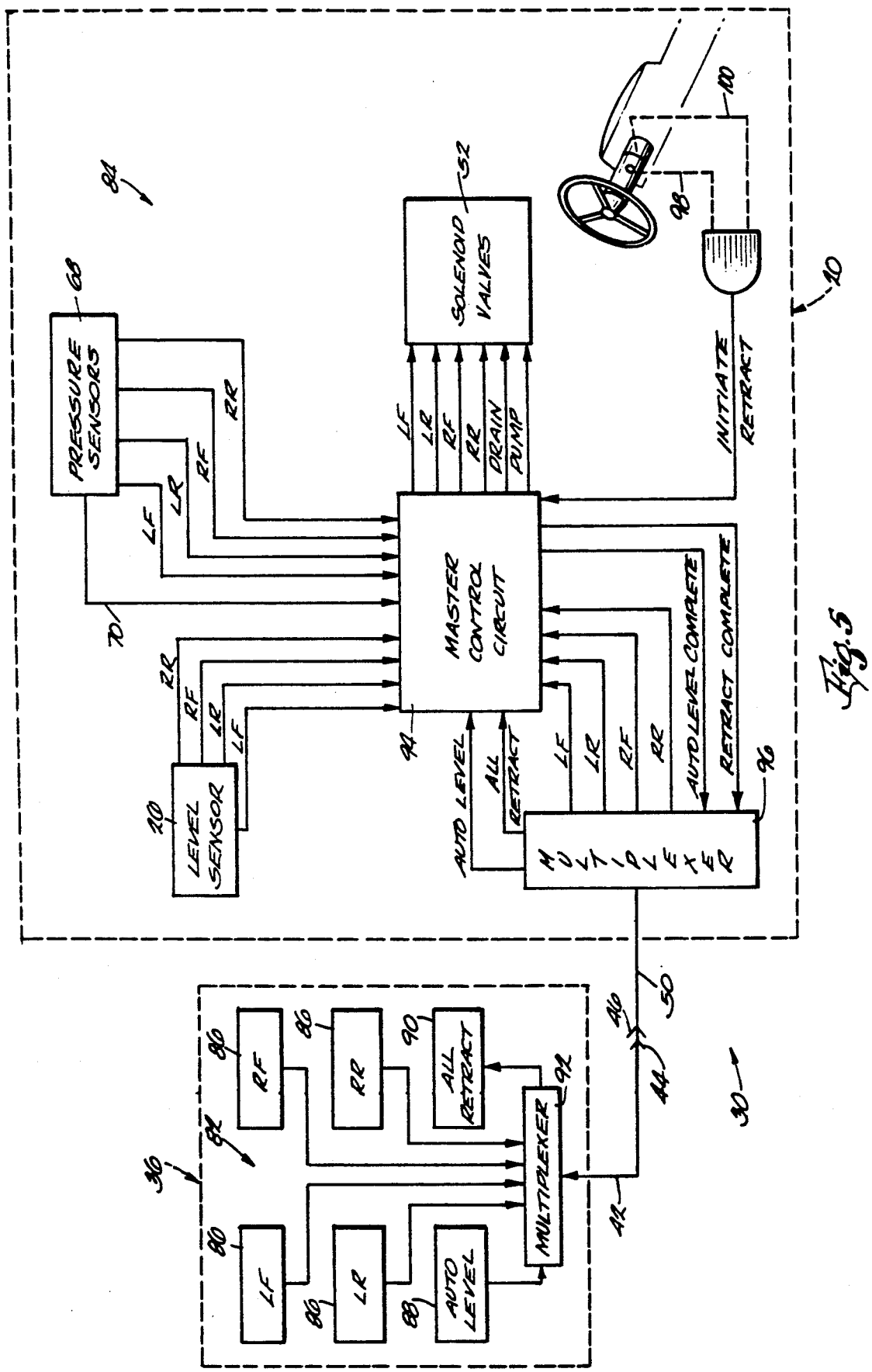
FIG. 5 is a schematic diagram of the electrical control system for the automatic leveling system.
Figure 6:
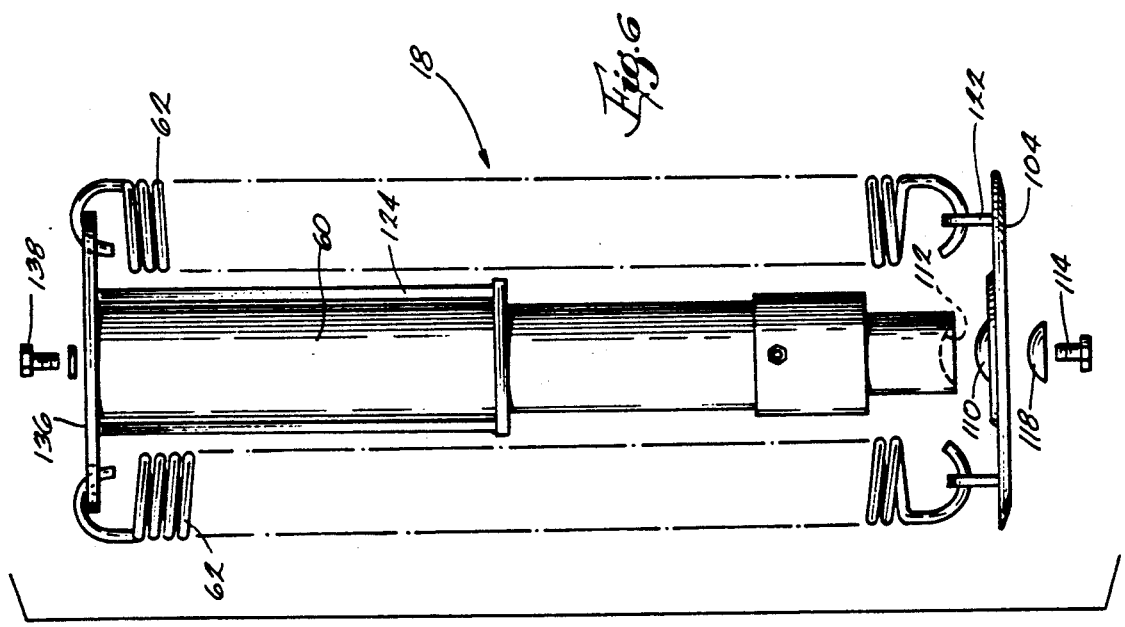
FIG. 6 is a front elevation view of a hydraulic jack assembly embodying one aspect of the invention.

The electronic control system 30 is illustrated in block diagram form in FIG. 5. As illustrated, the electronic control system 30 includes two subsystems or circuits 82, 84 associated, respectively, with the hand controller 36 and the central unit 20.

The hand control 36 includes individual control buttons 86 for manually directing the extension and retraction of the individual hydraulic jacks 18. This permits the operator to level the vehicle 12 manually without using the automatic leveling feature. In addition, the hand control 36 includes a button 88 for initiating the auto leveling sequence and further includes a button 90 for retracting all the jacks 18. As the jacks retract, hydraulic fluid is returned to the reservoir 24, thereby raising the fluid level in the reservoir. An electrical fluid level sensor 91 (FIG. 4) in the fluid reservoir 24 senses when fluid in the reservoir reaches a predetermined level and actuates a light on the control panel to indicate that the jacks are retracted and it is permissible to move the vehicle. A multiplexer circuit 92 of known construction communicates the control instructions generated by the various control buttons 86-90 to the central unit subcircuit 84 via the two conductor cable 42/50. This reduces the number of conductors necessary in the cable. In addition, the multiplexer 92 receives system status information from the central unit 20 to inform the operator of the current system status.

At the central unit 20, the electronic control system 30 includes a master control circuit 94 that responds to various control inputs to control overall system operation. System control inputs are received via the two conductor cable 42/50, and an additional multiplexer circuit 96. The received instructions are provided to the master control circuit 94. In addition, the multiplexer 96 returns system status indications to the hand controller 36.

The master control circuit 94 further receives various control inputs from the level sensor 26 and the pressure sensors 68. These control inputs indicate to the master control circuit 94 which corners of the vehicle 12 are low and what hydraulic pressures exist at various points in the system 10. In addition, the master control circuit 94 generates control outputs for controlling the hydraulic jack solenoid valves 52 as well as the pump solenoid and drain solenoid valves 74, 72.

Finally, the master control circuit 94 receives control inputs derived from certain systems in the recreational vehicle itself, such as the ignition system 98, to initiate the hydraulic jack retract sequence in the event an attempt is made to drive the vehicle 12 before retracting the jacks 18.

Preferably, the master control circuit 94 is implemented in a microprocessor-based circuit programmed to provide the three stage operating sequence described above. It will be appreciated, however, that a suitable control circuit can be implemented using discreet, hard wired components.

The hydraulic jack assemblies 18 are illustrated in detail in FIGS. 6-9. As shown, each jack assembly 18 includes one vertically oriented, single acting hydraulic cylinder 60 and a pair of return springs 62. In the illustrated embodiment, each hydraulic cylinder 60 is oriented so that its rod end 102 extends toward the ground.

In accordance with one aspect of the invention, a disc-shaped foot pad 104 is mounted to the distal or lowermost end 106 of the cylinder rod 102. The foot pad 104, which is preferably stamped from heavy gauge steel, contacts the ground and functions to distribute the lifting forces over a much larger area than would be covered by the cross sectional area of the cylinder rod 102 itself. This helps keep the cylinder rod 102 from sinking into the ground. Preferably, the diameter of the foot pad 104 is substantially 10 inches or greater, and the outer periphery of the foot pad preferably includes an upwardly turned lip 108 as best seen in FIG. 8.

Preferably, each of the foot pads 104 is mounted for limited pivotal motion relative to the cylinder rod end 106. To this end, each foot pad 104 includes an upwardly extending, dome-shaped or convex central portion 110, and a corresponding concave depression 112 is formed in the distal end 106 of the cylinder rod 102. A threaded fastener 114, extending through an aperture 116 at the center of the foot pad 104, engages the cylinder rod end 106 to secure the foot pad 104 to the cylinder rod 102. Preferably, a rigid member, such as a rounded metallic cup spacer 118, is provided between the head of the fastener 114 and the foot pad 104, and the aperture 116 in the foot pad 104 is substantially larger than the fastener shank, but smaller than the cup spacer 118, so as to permit pivoting movement of the foot pad 104 relative to the cylinder rod end 106.

To provide additional rigidity, each foot pad 104 preferably includes an upwardly raised angular portion 120 between the convex central portion 110 and the outer periphery 108. In addition, lugs 122 are provided for connection to lower ends of the return springs 62.

Figure 9:
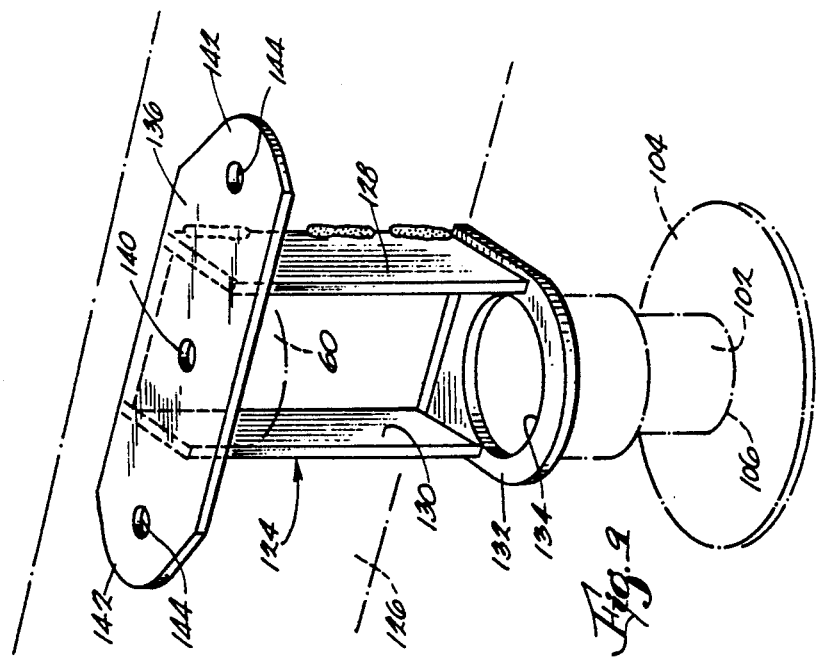
FIG. 9 is a perspective view of a hydraulic jack mounting bracket embodying various features of one aspect of the invention.

As further illustrated, each hydraulic jack 18 also includes a mounting bracket 124 for supporting the hydraulic cylinders 60 and securing the cylinders 60 to the vehicle frame 126. As best seen in FIG. 9, each mounting bracket 124 comprises an elongate three-sided channel member 128 defining an open channel 130 dimensioned to receive therethrough the hydraulic cylinder 60. A lower end plate 132 having an opening 134 dimensioned to permit extension of the hydraulic cylinder 60 therethrough is affixed to the lower end of the channel member 128. An upper end plate 136 is secured across the upper end of the channel 130 and is located so as to engage the upper end of the hydraulic cylinder 60 and prevent upward movement of hydraulic cylinder 60 relative to the channel member 128. Preferably, a fastener 138 extends through a central aperture 140 formed in the upper end plate 136 to secure the hydraulic cylinder 60 within the mounting bracket 124. The mounting bracket 124 itself, is welded or otherwise formed from heavy gauge steel and can be welded or bolted to the vehicle frame 126.

The ends 142 of the upper end plate 136 extend beyond the sides of the channel member 128 and provide attachment points for the upper ends of the return springs 62. To this end, apertures 144 are formed in the ends 142 of the end plate 136 and the ends of the return springs 62 are hooked through the apertures.

It will be appreciated that, with this construction, the substantial, upwardly directed forces developed by each of the hydraulic cylinders 60 are transferred directly through the end plate 136 to the three-sided channel member 128. The channel member 128, itself, provides a flat surface that is well suited for welding or bolting to the vehicle frame 126. This construction avoids the difficulties encountered when a cylindrical object, such as a hydraulic cylinder 60, is to be mounted to a flat surface so as to resist substantial sheer forces. A further advantage of the illustrated construction is that the hydraulic cylinder itself is not welded or otherwise permanently attached to anything and can be removed for servicing merely by disconnecting the springs 62 and loosening the top fastener 138.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An automatic leveling system for a recreational vehicle comprising:
   a plurality of hydraulic jacks;
   means for mounting said hydraulic jacks adjacent the underside of the recreational vehicle;
   means for extending each of said jacks until each of said jacks contacts the ground below the recreational vehicle with a first predetermined pressure;
   a level sensor for sensing a level condition;
   means responsive to said level sensor for further extending selected ones of said jacks until said level sensor senses a level condition; and
   means responsive to the achievement of said level condition for actuating any of said jacks that do not then exert a predetermined minimum pressure on the ground to ensure thereby that each of said jacks is in contact with the ground following establishment of the level condition.

2. An automatic leveling system as defined in claim 1 wherein each of said jacks includes a pressure sensor responsive to hydraulic pressure within said jack and operable to provide an indication of whether the hydraulic pressure in said jack is above or below said first predetermined pressure.

3. An automatic leveling system as defined in claim 2 wherein said means for extending each of said jacks includes a source of pressurized hydraulic fluid and a manifold, said manifold including a common chamber in fluid communication with said source and a plurality of fluid outlets in fluid communication with said hydraulic jacks and said common chamber.

4. An automatic leveling system as defined in claim 3 wherein said means for extending each of said jacks further includes a plurality of solenoid actuated valves in fluid communication with said fluid outlets and operable to control hydraulic fluid flow from said outlets.

5. An automatic leveling system as defined in claim 4 wherein said means for extending each of said jacks further includes an electronic control circuit coupled to said pressure sensors and said solenoid actuated valves, said electronic control circuit being operable to open an individual one of said solenoid actuated valves when hydraulic pressure in the associated one of said hydraulic jacks is below said first predetermined pressure and to close said solenoid actuated valve when the hydraulic pressure in the associated one of said hydraulic jacks is above said first predetermined pressure.

6. An automatic leveling system as defined in claim 5 wherein said first predetermined pressure and said predetermined minimum pressure are substantially equal.

7. An automatic leveling system as defined in claim 1 wherein said means responsive to the achievement of said level condition operates to actuate said jacks only after the passage of a predetermined time period following achievement of said level condition.

8. An automatic leveling system as defined in claim 7 wherein said predetermined time period is of sufficient duration to enable the recreational vehicle to come substantially to rest following actuation of said jacks to level the recreational vehicle.

9. An automatic leveling system as defined in claim 8 wherein said first predetermined pressure and said predetermined minimum pressure are substantially the same.

10. An automatic leveling system for a recreational vehicle, comprising:
    a source of pressurized hydraulic fluid;

a manifold having an inlet in fluid communication with said source and a plurality of fluid outlets communicating with said inlet;

a plurality of hydraulic jacks, each of said hydraulic jacks including a pressure sensor for sensing when an hydraulic pressure in the jack exceeds a predetermined threshold;

means for mounting said hydraulic jacks adjacent the underside of the recreational vehicle;

a plurality of hydraulic lines for communicating hydraulic fluid from said fluid outlets to said jacks;

a plurality of solenoid controlled valves coupled to said hydraulic lines and operable to control hydraulic fluid flow from said fluid outlets to said hydraulic jacks;

a level sensor; and an electronic control circuit responsive to said pressure sensors and operable to close the solenoid valve of a particular one of said hydraulic lines when hydraulic pressure in the jack coupled to said particular hydraulic line exceeds said predetermined threshold;

said predetermined threshold being sufficiently high as to extend said hydraulic jacks into contact with the ground when said jacks are mounted adjacent the underside of the recreational vehicle;

said electronic control circuit being nonresponsive to said level sensor as long as hydraulic pressure in any of said hydraulic jacks is below said predetermined threshold, said electrical contact circuit being responsive to said level sensor during an automatic leveling period that begins only after hydraulic pressure in all of said hydraulic jacks exceeds said predetermined threshold.

11. An automatic leveling system as defined in claim 10 wherein said electronic control circuit operates during said automatic leveling period to open selected ones of said solenoid valves as determined by said level sensor to actuate selected ones of said hydraulic jacks as necessary to place the recreational vehicle in a level attitude.

12. An automatic leveling system as defined in claim 11 wherein said automatic leveling system further includes an additional pressure sensor responsive to hydraulic pressure in said manifold and operable to provide an indication when hydraulic pressure in said manifold exceeds a second predetermined threshold higher that said first predetermined threshold.

13. An automatic leveling system as defined in claim 12 wherein said automatic leveling system further includes means responsive to said additional pressure sensor for deactivating said source of pressurized hydraulic fluid when hydraulic pressure in said manifold exceeds said second predetermined threshold.

14. An automatic leveling system as defined in claim 11 wherein said electronic control circuit opens selected ones of said solenoid valves as necessary to maintain a hydraulic pressure of at least said first predetermined threshold in each of said hydraulic jacks after termination of said automatic leveling period.

15. An automatic leveling system as defined in claim 14 wherein said electronic control circuit provides a predetermined delay between the termination of said automatic leveling period and the opening of selected ones of said solenoid valves to maintain at least said first predetermined threshold pressure in each of said hydraulic jacks.

16. An automatic leveling system as defined in claim 15 wherein said predetermined delay is substantially three seconds or more.

17. A method of operating a recreational vehicle automatic leveling system of the type having a plurality of hydraulic jacks and a level sensor for sensing a level condition, said method comprising the steps of:

extending each of the jacks until each of the jacks contacts the ground below the recreational vehicle with a first predetermined pressure;

thereafter extending selected ones of the jacks until the level sensor senses a level condition; and thereafter actuating any of the jacks that do not then exert a predetermined minimum pressure on the ground to ensure thereby that each of the jacks is in contact with the ground following establishment of the level condition.

18. A method as defined in claim 17 further comprising the additional step of incorporating a predetermined time delay between attainment of the level condition and actuation of the jacks that do not then exert the predetermined minimum pressure on the ground.

* * * * *